Fig. 1

INVENTOR.
ERNEST V. BUNTING
BY
Wolfe, Hubbard, Voit & Osann
ATTORNEYS.

March 22, 1966  E. V. BUNTING  3,241,621
TRACTOR HYDRAULIC CONTROL SYSTEM
Filed Jan. 30, 1964  6 Sheets-Sheet 2

INVENTOR.
ERNEST V. BUNTING
BY
Wolfe, Hubbard, Voit & Osann
ATTORNEYS.

INVENTOR.
ERNEST V. BUNTING

United States Patent Office 3,241,621
Patented Mar. 22, 1966

3,241,621
TRACTOR HYDRAULIC CONTROL SYSTEM
Ernest V. Bunting, Detroit, Mich., assignor to Massey-Ferguson Inc., Detroit, Mich., a corporation of Maryland
Filed Jan. 30, 1964, Ser. No. 341,346
5 Claims. (Cl. 172—9)

This application is a continuation-in-part of my application Serial No. 119,220, filed June 23, 1961, and now abandoned, and application Serial No. 246,995, filed Dec. 26, 1962.

This invention relates to agricultural tractors and concerns, more particularly, a hydraulic control system for tractors of the general type known as "Ferguson system" tractors.

The basic "Ferguson system" provided a tractor with hydraulically lifted draft links and a draft force feedback for controlling the volume of hydraulic pressure fluid in the draft link lift cylinder. Improvements and refinements have been made to the basic system through the addition of alternately usable link-position control and hydraulic-pressure control to the basic draft control capability. Such versatility inherently complicates the control system and presents the substantial problem of keeping the operator's controls simple, easy to operate and virtually foolproof, without sacrificing operating versatility.

Improvements in the control system, at least in the systems widely used commercially, usually modified the basic control valve and linkage arrangement in which the control valve was biased toward the fluid exhaust or implement lowering position and compression in the upper link acted through the control linkage in opposition to the valve bias. This basic arrangement is somewhat limiting in the more complicated control systems.

Accordingly, it is the primary object of the present invention to provide an improved tractor control arrangement particularly well suited for versatile, multifunction control systems. More specifically, it is an object to provide a hydraulic control system for a tractor utilizing a single main control valve, which is biased toward the fluid supplying or link lifting position, and a plurality of control linkages operating independently on the main valve in opposition to the valve bias, that is, in the fluid discharge or link lowering direction.

Another object is to provide a control system of the above type which gives the operator the convenience of one-lever operation when he is working an implement under draft control, without sacrificing the instant availability of an alternate control mode such as position control. A collateral object is to avoid the undesirable use of conventional controls by a tractor operator in order to achieve a form of one-lever control.

A further object is to provide a control system as characterized above which avoids skipping or chattering as an implement is lowered toward a selected depth or draft setting. Moreover, the control system of the invention readily permits the setting of a desirable limiting factor on draft control operation such as placing a ceiling on link elevation.

It is also an object to provide a production embodiment of the control system described above which is of reliable, simplified construction to facilitate its manufacture, its initial assembly, and its adjustment.

Other objects and advantages of the invention will become apparent upon reading the following detailed description and upon reference to the drawings, in which.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

*Control system outline*

Figure 1:
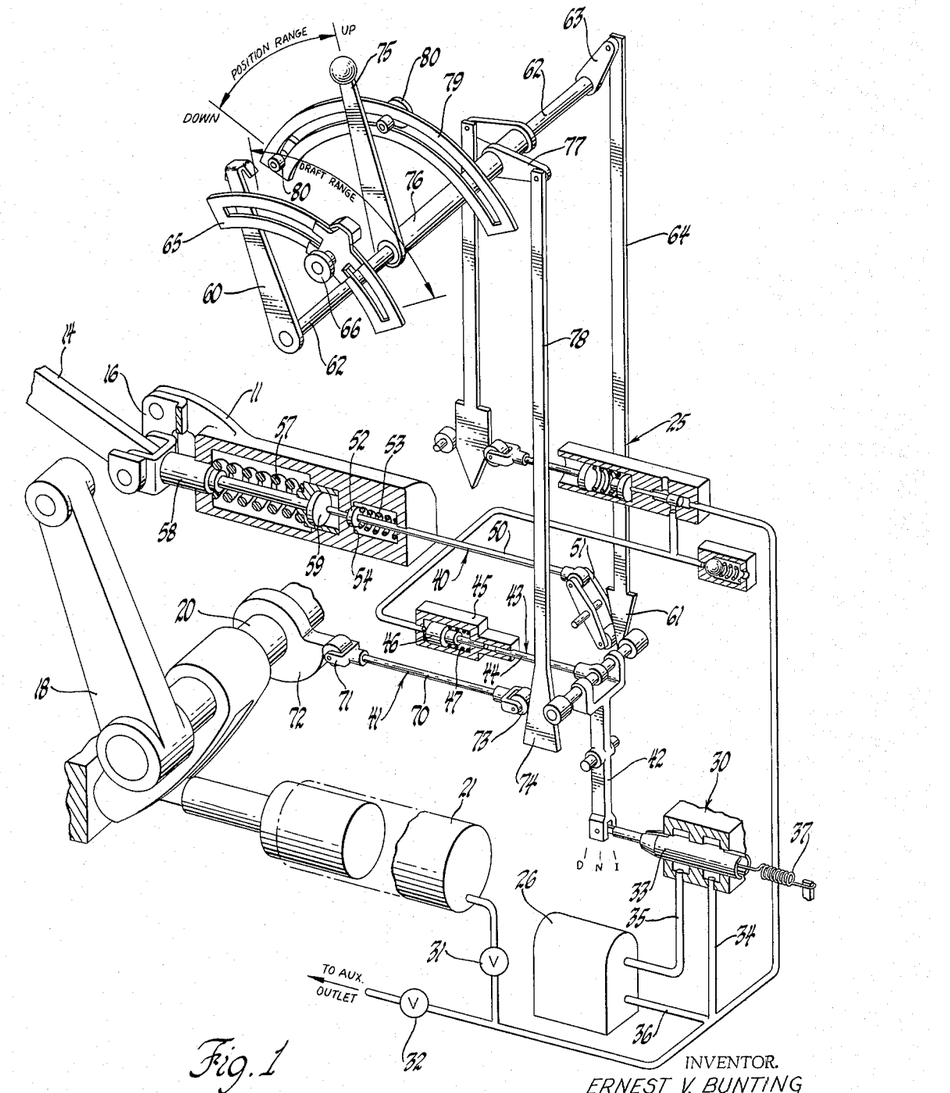
FIGURE 1 is a partially diagrammatic perspective of a control system embodying the present invention.
Figures 2, 3:
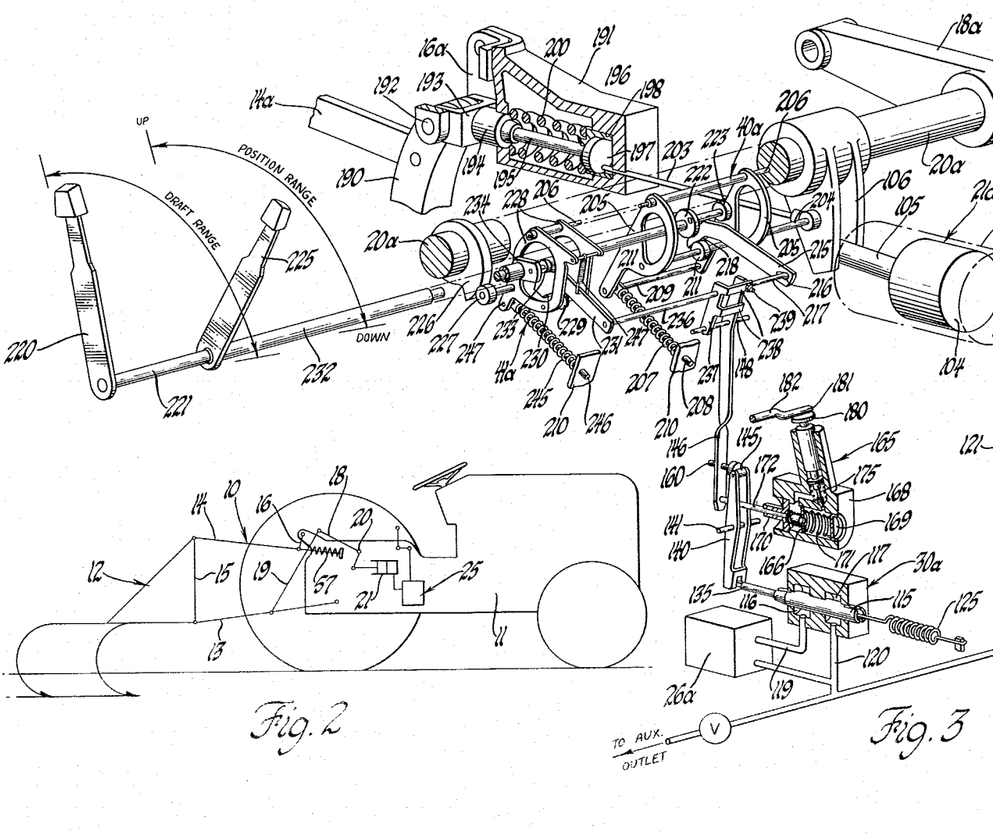
FIG. 2 is a schematic side elevation of a tractor-implement combination utilizing a control system of the type shown in FIG. 1.
FIG. 3 is a fragmentary, partially schematic, perspective of a structurally modified control system also embodying the invention.

Before turning to a consideration of the details of a commercial embodiment of the invention, it will be helpful to review the invention as shown in diagrammatic FIG. 1 and schematic FIG. 2 which shows a tractor-implement combination 10 in which a tractor 11 supports an implement 12 on a hitch linkage including a draft link 13 and a top control link 14. The draft link 13 is trailingly pivoted on the tractor 11 and releasably coupled to the lower portion of an A-frame 15 forming a portion of the implement 12. The top control link 14 is floatingly pivoted on the tractor 11 through a rocker 16.

To effect weight transfer from the implement to the tractor, the tractor includes a lift arm 18 coupled to the draft link 13 through a drop link 19. The lift arm 18 is rigidly secured to a rock shaft 20 which is selectively rotated by a hydraulic actuator or ram 21 under the control of a control system 25. Those familiar with this art will recognize that the tractor-implement combination 10 embodies a "Ferguson system" hitch and that such systems use a pair of trailing draft links 13 each coupled by separate drop links 19 to a pair of lifting arms 18 which are secured to the common rock shaft 20, although for convenience only single ones of these elements have been illustrated herein.

The tractor hydraulic control system 25 for controlling the operation of the actuator 21 includes a positive displacement pump 26 as a source of fluid under pressure and a control valve 30 supplies fluid to, or exhausts fluid from, the actuator 21 through a shut-off valve 31. The shut-off valve 31, together with a second shut-off valve 32, permits the output from the pump 26 to be alternatively directed to an auxiliary actuator.

The control valve 30 is of a familiar type in systems of this kind and includes a shiftable spool or valve element 33 positioned on the intake side of the pump 26. The valve 30 has an infinite number of positions ranging from full discharge to full intake with a neutral or locking position in the center of the range. With the element 33 shifted toward the left in FIG. 1, that is, toward the full discharge position, fluid is vented from the actuator 21 through a line 34. When the valve element 33 is shifted toward the right in FIG. 1, or toward the fluid supply or intake position, fluid is admitted through a line 35 to the pump 26 which directs the fluid, under pressure, through a line 36 to the actuator 21.

In keeping with the invention, the valve 30 is biased by a spring 37 toward its fluid supply or intake position and a pair of control linkages 30 and 41 act through a control lever 42 on the valve element 33 in opposition to the biasing spring, with each of the linkages 40, 41 embodying a one-way or lost motion connection so that each linkage can take over from, or override, the other in moving the valve toward discharge position.

The system diagrammed in FIG. 1 includes a third linkage 43 affording pressure control of the system and it too has a one-way connection with the control lever 42 that includes a rod 44 which is freely slidable in an actuator housing 45 toward and away from a plunger or piston 46. The piston 46 is normally biased by a compressed helical spring 47 away from the rod 44 and, hence, the inactive position of the pressure control linkage 43 leaves the control lever 42 unaffected through its full range of movement. Eliminating the pressure control linkage 43 thus has no effect on the function or interaction of the other control linkages 40 and 41 and the following description does not discuss this added control since it is not a part of the embodiment shown in FIGS. 3 et seq. For a detailed discussion of the pressure control arrangement and function, reference may be had to my copending application Serial No. 341,548, filed January 31, 1964.

The control linkage 40 is a draft control linkage and it includes a rod 50 which acts on the control lever 42 through a direction reversing lever 51. The rod 50 carries a collar 52 and is biased by a spring 53, which engages the collar, toward a limit position with the collar abutting a wall 54 in the rear housing of the tractor 11. The spring 53 is substantially stronger than the control valve biasing spring 37 so that the spring 53 overcomes the force of the spring 37 and the rod 50 urges, through the levers 51 and 42, the valve 30 toward its discharge position.

The top control link 14, pivoted on the rocker 16, is biased toward a neutral position by a heavy two-way spring 57 that acts on a plunger 58 which is also secured to the rocker 16. Tension in the link 14 causes the plunger 58 to slide toward the left in FIG. 1, compressing the spring 57. Compression in the top control link 14 causes the plunger 58 to move toward the right in FIG. 1, also compressing the spring 57, and causing an enlarged end 59 of the plunger to strike the rod 50 and slide it toward the right. Thus, with a draft implement coupled to the tractor hitch linkage, an increased draft force increases compression in the top link 14 causing the rod 50 to slide to the right and rotate the lever 51 clockwise, whereupon the spring 37 is permitted to shift the valve 30 and the control lever 42 to the valve intake position. This directs additional fluid to the actuator 21, causing the lift arms 18 to be raised and thus lessening the draft load by bringing the implement closer to the surface of the ground. A decreased draft load causes an opposite result. The draft control linkage 40 therefore tends to maintain a constant draft loading in the manner which has become familiar with those skilled in this art.

To permit selection of the draft force to be maintained by the control system, a hand operated draft control lever 60 is coupled to a cam 61 through a shaft 62, an arm 63, and a drop link 64. As is conventional, the draft control lever 60 swings adjacent a quadrant structure 65 carrying a positionable locator 66 which allows the operator to quickly swing the control lever to a preselected position without obstructing the full range of movement of the lever. Swinging of the control lever 60 causes the cam 61 to vary the effective length of the draft control linkage 40 and thus vary the degree of compression in the spring 57, due to either tension or compression forces in the upper link 14, which is required to alter the position of the valve 30. With the control lever 60 in its illustrated full-up position, a friction reducing roller on the lower end of the lever 51 is spaced slightly from the cam 61 due to the spring 53 urging the rod 50 against the end wall 54 and the valve 30 is then under control of the alternate control linkage 41.

Swinging the control lever 60 down, clockwise in FIG. 1, into the "draft range," lowers the cam 61 so as to first swing the control lever 42 in a clockwise direction, thus shifting the valve 30 to its discharge position. This vents fluid from the actuator 21 and causes lowering of the lift arms 18 so that the draft implement 12 coupled to the tractor hitch linkage moves into the ground. As a draft force is developed, the top control link 14 is placed in compression, or reduced tension, against the resistance of the spring 57 and the plunger 58 gradually moves to the right until the rod 50 is engaged and shifted toward the right sufficiently far to rotate the lever 51 and allow the spring 37 to shift the valve 30, and swing the control lever 42, back to their neutral positions. It will, of course, be seen that the further forward the draft control lever 60 is swung, the greater is the compressive force required in the top link 14 to restore the control valve 30 to neutral, and, hence, the setting of the lever 60 dictates the draft load that is maintained by the control system.

The control linkage 41 is a position control linkage and it includes a rod 70 having a cam follower 71 at one end which rides on a spiral cam 72 that is secured to the rock shaft 20. The opposite end of the rod 70 carries a cam follower 73 which acts on the control lever 42 through a vertically positionable cam 74. The linkage 41 thus acts as a position feedback linkage relating the angular position of the rock shaft 20, and thus the elevation of the hitch linkage, to the operation of the control valve 30. If the control lever 42 is rocked clockwise, again as seen in FIG. 1, so as to shift the valve 30 toward its discharge position, fluid is exhausted from the actuator 21 and the rock shaft 20 turns in a counterclockwise direction to shift the rod 70 toward the left, thereby restoring the control lever 42, and hence the valve 30, to their neutral positions under the bias of the spring 37.

To permit selection of a desired vertical position of the hitch lift arms 18, a hand operated position lever 75 is coupled to the cam 74 through a sleeve 76, an arm 77, and a drop link 78. The lever 75 swings adjacent a quadrant segment 79 having a pair of adjustable stops 80. The lever is shown in its full-up, transport position wherein the rod 70 must be urged as far as is possible to the right in FIG. 1 by the highest point on the cam 72 to hold the valve 30 in its neutral position. In other words, the valve 30 has been brought to the neutral position with the lift arm 18 in its fully raised, transport position. Swinging the lever 75 rearwardly, counterclockwise in FIG. 1, from its straight-up transport position through the "position range" lifts the cam 74 so as to first cause the control lever 42 to rock clockwise thereby shifting the valve 30 to its discharge position. This vents fluid from the actuator 21 and causes the lift arm 18 to be lowered and the rock shaft 20 to rotate counterclockwise. The cam 72 thus allows the rod 70 to gradually shift toward the left in FIG. 1 so that the spring 37 can again move the valve 30 to its neutral position, with the rock shaft 20 occupying the position selected by the positioning of the lever 75. The lever 75 thus provides, through the "position range," direct vertical position control for the tractor hitch linkage.

In summary, it will now be understood that the control valve 30 in the system 25 is biased by the spring 37 in an intake or link lifting direction so that the spring tends to keep the hitch linkage in transport position. The linkages 40, 41 with their control levers 60, 75 can take over, one from the other, in a fluid exhausting or link lowering direction. As a result, with the links in transport or upraised position and the control handles 60, 75 straight up, either handle being swung downwardly lowers the implement and the corresponding control linkage 40 or 41 positions the hitch linkage and the implement. From an implement lowered, operating position with the levers 60, 75 down, both handles must be moved above the desired setting for the hitch linkage and then the applicable control linkage 40, 41 controls the implement position.

Thus, with the control system 25, the lever 75 can be left upright in transport position and the tractor operator need use only the draft control lever 60 for full control of the implement between transport and ground engaging position and also to set the desired draft loading. One lever control is thus attained and the control lever 75 is left alone or used simply to set a "ceiling" beyond which the implement will not be raised in the event that it is undesirable to lift the implement clear of the ground or remove it from ground working engagement.

The control system 25 also eliminates "skipping" when a draft implement such as a moldboard plow is lowered into the ground. This is because the lowering action of the implement and the setting of the desired draft load is accomplished entirely by the lever 60 and the corresponding control linkage 40 and there can be no false signal from two competing control linkages to interfere with the smooth operation of the system.

As a further practical advantage of the control system 25, the true one-lever control of a draft implement which is attained makes it unnecessary for a tractor operator to misuse his control system in order to obtain a form of one-lever control, as was often the case with prior commercial forms of tractor hydraulic control systems.

*Production embodiment*

An embodiment of the invention well suited for commercial production is shown in FIGS. 3 et seq. in which parts corresponding directly to those previously described have been given the same reference numerals with the distinguishing suffix "a" added. Of course, a large number of elements in this embodiment correspond functionally to those shown in FIGS. 1 and 2, but, for clarity, only certain elements having direct structural similarity have been designated with the "a" suffix convention.

Figure 4:
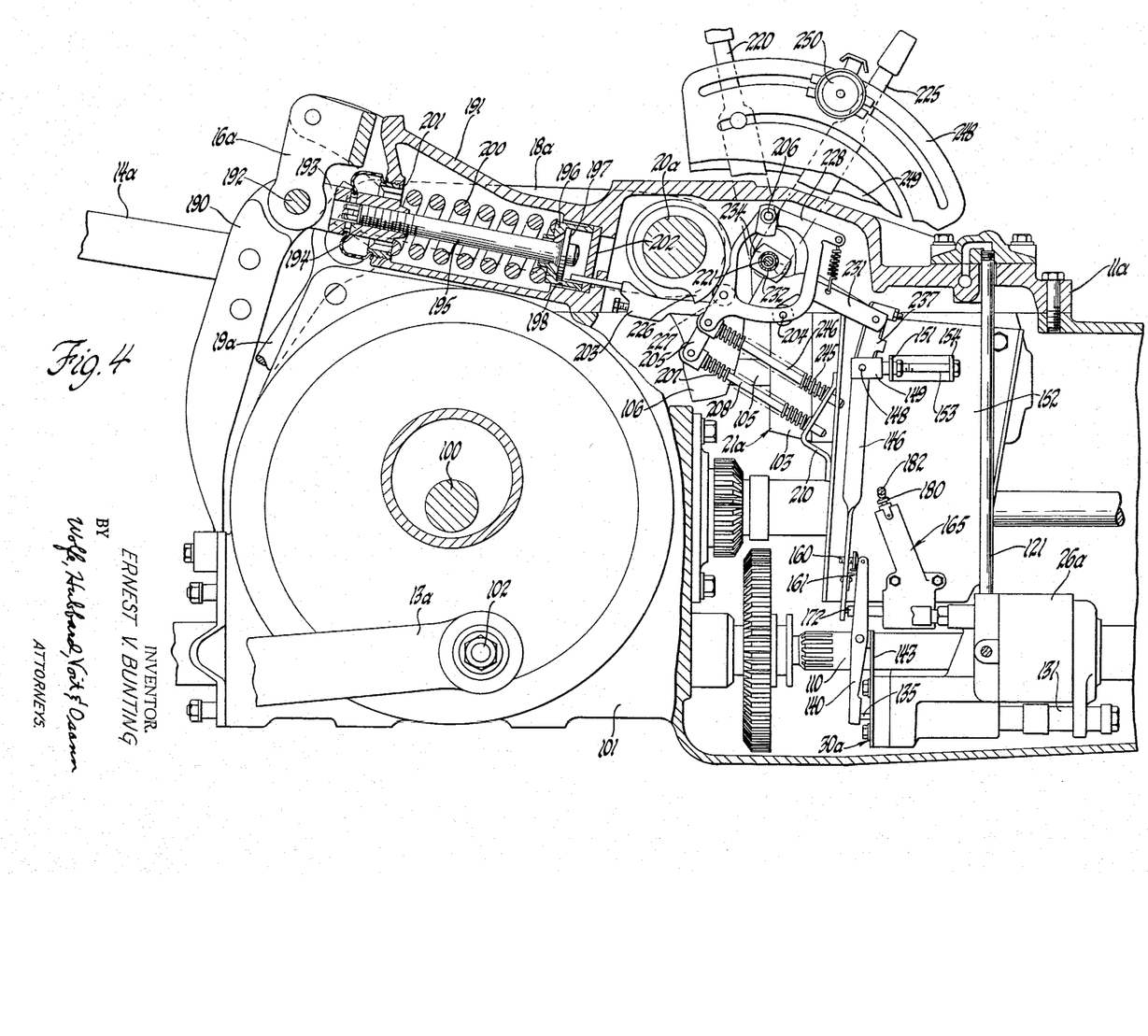
FIG. 4 is a fragmentary longitudinal section of the upper rear portion of a tractor embodying the control system shown in FIG. 3.

Considering first FIGS. 3 and 4, there is shown a portion of a tractor 11a having a rear housing 101 which, together with a gear box and an engine, constitute the backbone of a frameless tractor body. The tractor 11a is provided with a hitch linkage that includes a pair of draft links 13a and an upper or control link 14a. The draft links 13a are arranged in trailing relation to the tractor and converge forwardly with their forward ends pivoted as at 102 on the tractor housing 101 to swing vertically about a horizontal axis located below and slightly forward of the axle 100 for the tractor drive wheels. The pivots 102 customarily permit some lateral swing of the draft links 13a, as well as vertical swinging movements utilized for raising and lowering the implement coupled to the hitch.

*Hydraulic power mechanism*

Raising and lowering of the draft links 13a is effected through the medium of a hydraulic power mechanism that is driven from the tractor engine. In the illustrated construction, the power mechanism includes a hydraulic actuator 21a in the form of a one-way ram comprising a cylinder 103 fixed to the housing 101 and mounted with its open end facing rearwardly and receiving a piston 104. A piston rod 105 extends from the piston 104 and is connected by a ball-and-socket joint with a crank arm 106 splined to a rock shaft 20a journalled in the housing 101. The laterally projecting ends of the rock shaft 20a are fitted with lift arms 18a that are conneced by drop links 19a with the respective draft links 13a. The arrangement is such that when pressure fluid is supplied to the closed end of the cylinder 103, the piston 104 is forced rearwardly to rock the shaft 20a in a direction to raise the draft links 13a. Conversely, upon exhaust of fluid from the cylinder 103, the piston is permitted to retreat into the cylinder under the urging of a gravity load on the links 13a so that the links swing downwardly in a lowering direction.

Pressure fluid is supplied to the actuator 21a from a positive displacement pump 26a located in the housing 101 below the actuator. The housing constitutes a sump or reservoir for the oil or other fluid used by the hydraulic system and the pump 26a is customarily submerged in the oil supply. The supply of fluid to the actuator 21a, and exhaust of fluid therefrom, is controlled by a main control valve 30a that is arranged to meter fluid flow to the pump intake and to control lowering of the draft links by opening and closing an outlet port through which the pump delivery may be by-passed and fluid exhausted from the actuator 21a.

As is conventional, the pump 26a is driven through a pump and PTO shaft 110 independently of the change speed transmission of the tractor.

*Control valve mechanism*

The control valve 30a includes a plunger 115 slidable axially through a pair of alined valve chambers including a low pressure inlet chamber 116 and a high pressure outlet chamber 117 formed by an assembly of rings and sleeves within a bore 118 in the housing of the pump 26a. The pump inlet is in communication with the chamber 116 through an inlet passage 119. The pump outlet communicates with the chamber 117 through a passage 120 and is also connected with the actuator 21a by a supply conduit 121.

Figures 7, 8:
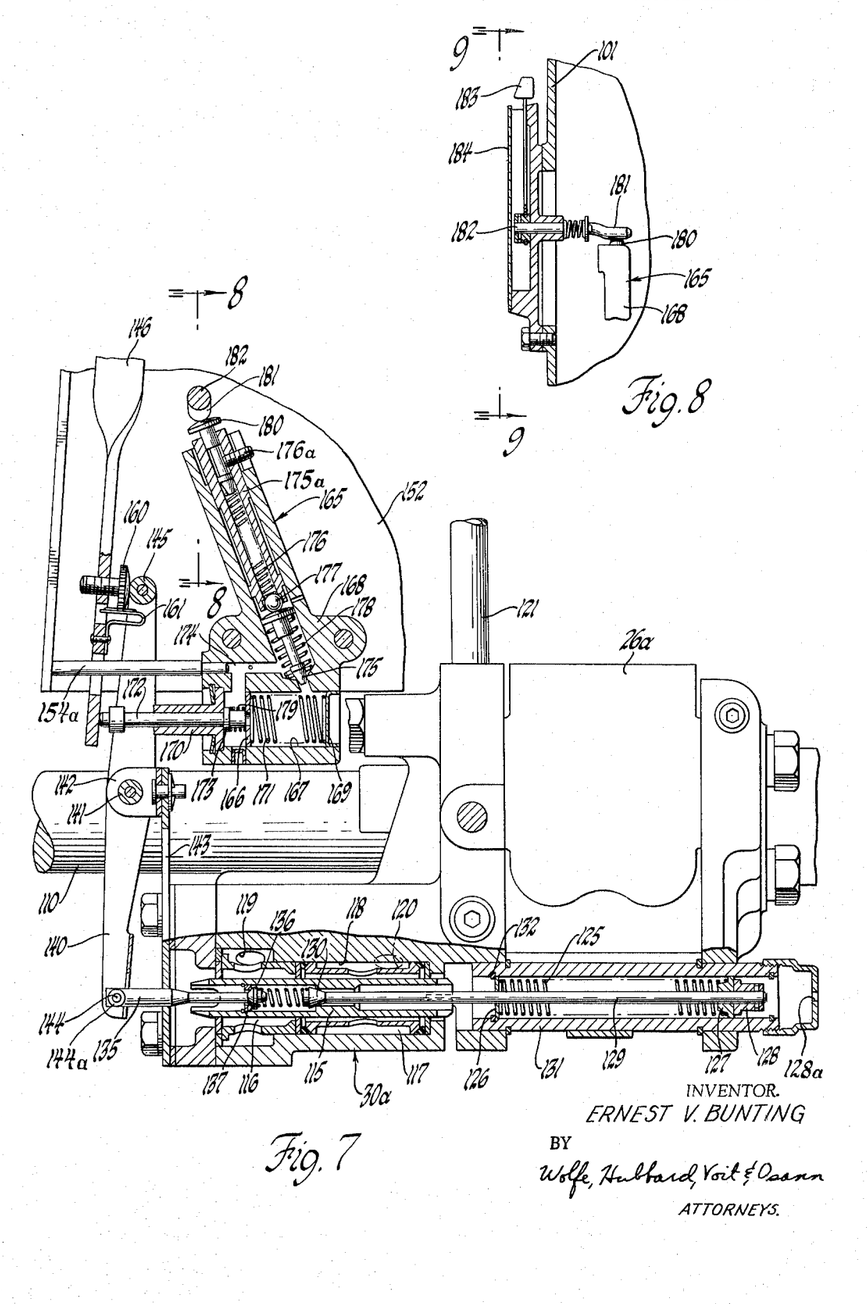
FIG. 7 is a fragmentary enlarged section showing the lower portion of the structure appearing in FIG. 4.
FIG. 8 is a fragmentary section taken approximately along the line 8—8 in FIG. 7.

The plunger 115 is dimensioned so that when in a neutral position it effectively blocks both the inlet chamber 116 and the outlet chamber 117 from the sump. As a result, entry of oil to the pump inlet is prevented and exhaust of fluid from the actuator is blocked so that the fluid is locked in the system and the actuator piston 104 remains stationary. As the plunger 115 is shifted forwardly, that is to the right as seen in FIG. 7, the tapered and slotted rear end gradually opens the chamber 116 to the sump allowing the pump to draw in fluid and deliver it under pressure. Under such conditions, the plunger 115 continues to block the chamber 117 from the sump and consequently the pressure fluid delivered by the pump is supplied to the actuator 21a to move the piston 104 rearwardly and raise the hitch linkage through the rock shaft 20a as described above.

Shifting of the valve plunger 115 in the opposite direction, toward the rear of the tractor, opens the high pressure chamber 117 to the sump while maintaining the inlet chamber 116 blocked so that no fluid can enter the pump. Fluid delivery ceases and the fluid in the actuator cylinder 103 is permitted to exhaust to the sump under the pressure exerted on the piston 104 by the weight of the hitch and the implement attached to it. As is conventional, the forward end portion of the plunger 115 is tapered and slotted to provide for precise metering of the fluid exhaust from the actuator 21a and thus accurate regulation of the hitch linkage lowering.

In keeping with the invention, the plunger 115 is biased toward its intake position or to the right as seen in FIG. 7. Such biasing is affected by a helical compression spring 125 interposed between a stationary abutment 126 and a collar 127 abutting a head 128 fixed to the outer end of a rod 129 operatively connected with the plunger 115. The rod 129 extends axially into the plunger 115 and the operative connection is provided by a tapered head 130 on the rod that is fitted into a complementary socket formed in the central portion of the plunger, the head and socket preferably being non-circular to prevent relative rotation of the parts. The outer end of the rod and the compression spring 125 are enclosed in a tubular housing 131 rotatably mounted in the pump body in axial alinement with the valve bore 118. A snap ring 132 in the inner wall of the housing 131 holds the abutment 126 stationary.

For shifting the valve plunger 115 against the bias of the spring 125 toward the fluid exhaust or link lowering position, a valve actuating rod 135 is fitted into the rearward end of the plunger and provided with a semi-cylindrical head 136 that engages a complementary forwardly facing socket formed in an abutment member 137 held against movement to the left by a snap ring within the plunger 115. The valve rod 135 extends rearwardly through an aperture in the abutment member 137 for connection with the valve actuating mechanism including the controls for obtaining draft and position control of the hydraulic system. It should be noted that movement of the valve is dampened by flow of oil through the orifice 128a at the right end of the housing 131.

*Valve actuating mechanism*

The valve actuating mechanism of this embodiment includes a draft control linkage 40a, a position control linkage 41a, and linkage parts which are common to both controls. The common part of the linkage includes a first valve lever 140 pivoted intermediate its end by a sleeve-like bushing 141 that is supported on a bracket 142 carried by a support plate 143 rigidly mounted on, and extended upwardly from, the rear end of the housing of the valve 30a. The upper end of the lever 140 is bifurcated and arranged to straddle the bracket 142. At its lower end, the lever 140 is slotted to receive the projecting end of the valve actuating rod 135 carrying rollers 144a on pin 144 that engage the lever so that the rod, and with it the valve plunger 115, are pulled toward the left or fluid exhaust position against the bias of the spring 125 when the lever 140 is rocked clockwise as shown in the drawings.

At its upper end, the lever 140 carries an abutment roller 145 through which valve actuating movements are received from a second valve lever 146. The lever 146, in the illustrated construction, is in the form of an elongated flat bar having its upper portion disposed edgewise in a fore and aft direction and having its lower end twisted relative thereto through an angle of ninety degrees. Adjacent its upper end, the lever 146 is pivotally mounted on a sleeve 147 (see FIGS. 10–13) secured by a pin 148 in a yoke 149 supported for adjusting movement transversely of the axis of the pivot. For this purpose, the yoke 149 has a tubular shank 150 slidably supported in an opening in a bracket ear 151 on an upright support plate 152 secured in depending relation from the actuator 21a.

The shank 150 of the yoke 149 is threaded to receive an adjusting bolt 153 which extends through a second bracket ear 154 (FIGS. 4–6) on the plate 152 and that is spaced from the ear 151 with the head of the bolt 153 abutting the forward side of the ear 154. The yoke 149 is prevented from rotation by the pin 154a which passes through a slot in the lower end of lever 146 and, accordingly, the shank and the yoke 149 may be shifted forwardly or rearwardly by rotation of the bolt. A lock nut 155 threaded on the bolt and engageable with the forward end of the shank 150 provides for locking the parts in adjusted position.

Adjacent its lower end, the lever 146 carries a contact element in the form of a large headed screw 160 (FIGS. 3, 4 and 7) engageable with the abutment roller 145 of the first valve lever 140. By screwing the contact element in or out, the relationship between the two levers 140, 146 can be adjusted and such adjustment is retained by means of a spring detent 161 mounted on the lever 146 and positioned to engage the serrated edge of the head of the screw 160.

The lower end of the lever 146 is also positioned to cooperate with a dashpot device 165 (see FIG. 7) adapted to retrict the speed at which the lever 146 can swing in a counterclockwise direction to shift the main valve plunger 115 toward its exhaust position. The device 165 includes a piston 166, having a central opening, which floats in a cylinder 167 bored in a housing 168 that is secured to the lower end of the support plate 152. The ends of the cylinder 167 are closed, respectively, by a plug 169 and a collar 170. The piston 166 is urged by a compression spring 171 seated on the plug 169 against a plunger 172 that slides freely in the collar 170 in contact with the lever 146. The spring 171, in holding the piston 166 against the plunger 172, causes the end of the plunger to close the central opening in the piston and moves the parts to the left in FIG. 7 until a stop 173 engages the collar 170.

The ends of the cylinder 167 are interconnected by a passage 174 and both the cylinder 167 and the passage 174 are filled with oil. Movement of the piston 166 to the right in FIG. 7 is restricted or dampened since oil on the right side of the piston must pass an orifice valve element 175 restricting the passage 174. The dampening or restricting effect on movement of the piston 166 to the right limits the rate at which the plunger 172, and, hence, the lever 146, can be shifted to turn the lever clockwise and slide the main valve plunger 115 in its exhaust direction. The dashpot device 165 thus limits the suddenness with which the fluid can be exhausted from the actuator 21a and the hitch linkage dropped.

Return movement of the piston 166, toward the left in FIG. 7 is unrestricted since the pressure of oil at atmosphere pressure acting on the left side of piston 166 in combination with the force of spring 179 is sufficient to overcome the force of spring 171 and the subatmosphere pressure in the expanding chamber 167 on the right side of piston 166 to hold the piston 166 away from plunger 172. This allows oil to flow freely through the piston 166 and the plunger 172 can follow the movement of lever 146 to the left. When movement of the lever 146 halts, the plunger 172 is arrested and the stronger spring 171 and now normal pressure in the chamber 167 overcomes the force of the spring 179 and seats the piston 166 against the end of the plunger 172 so as to close the central opening in the piston. This conditions the parts for again restricting movement of the lever 146 toward the right in FIG. 7.

Figure 9:
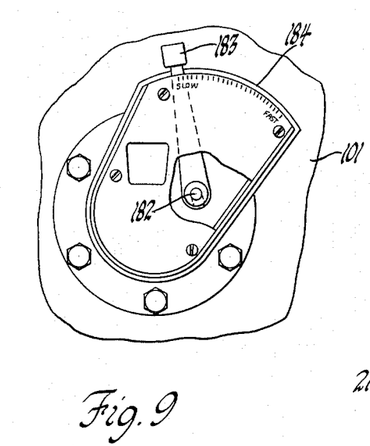
FIG. 9 is a fragmentary elevation taken along the line 9—9 of FIG. 8.
Figure 10:
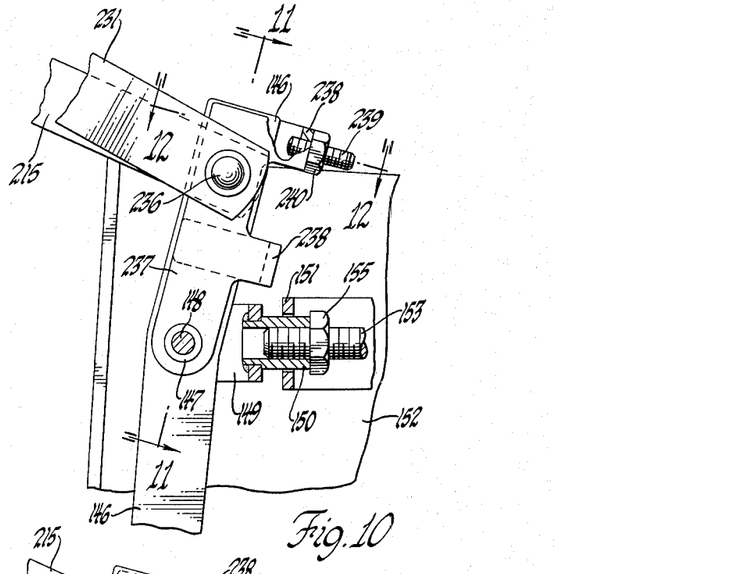
FIG. 10 is an enlarged fragmentary section of a portion of the linkage otherwise appearing in FIGS. 4, 5 and 6.
Figure 11:
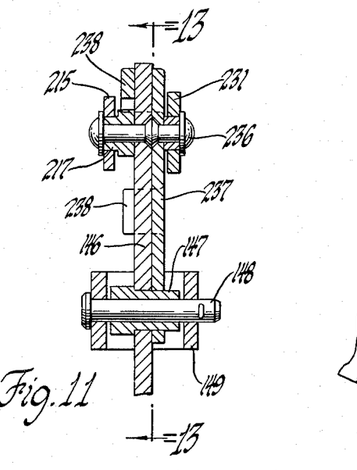
FIGS. 11 and 12 are fragmentary sections taken approximately along the lines 11—11 and 12—12, respectively, in FIG. 10.
Figure 12:
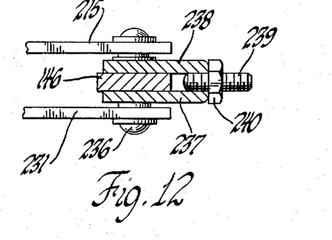
Figure 13:
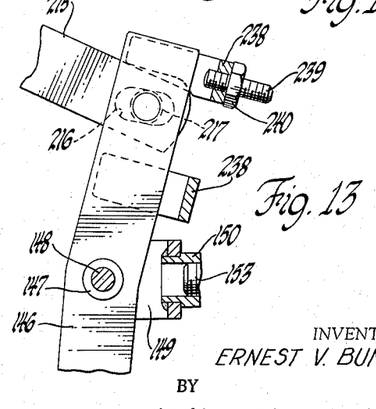
FIG. 13 is a fragmentary section taken along the line 13—13 in FIG. 11.

The position of valve element 175 and hence restriction of flow through passage 174 is determined by the position of an adjustable length assembly including a sleeve 175a, a slidable stop 180 biased by a spring 176 and held in position by set screw 176a and ball 177 fixed in the end of sleeve 175a. The valve element 175 is biased by a spring 178 against this assembly, whose length is initially adjusted by loosening set screw 176a. The assembly and valve element 175 is moved by an eccentric 181 on a shaft 182. The shaft 182 is pivoted in a plate closing or opening in the tractor housing 101 (see FIG. 8) and carries, at its outer end, a finger lever 183 (see also FIG. 9) which is adapted to swing adjacent a scale 184 that facilitates adjustment of the angular position of the shaft 182 and, hence, the position of the shaft eccentric portion 181 with relation to the movable stop 180. The lever 183 thus permits setting of the valve element 175 and this, as explained above, permits selection of the extent of the dashpot effect exerted by the device 165.

*Draft control*

To achieve automatic draft control, soil reaction on an implement is measured by a control spring assembly on the tractor to which the top link 14a of the hitch is connected, in this instance through the medium of a lever 190 (see particularly FIG. 4). The control spring assembly is enclosed in a hollow extension 191 of the housing 101 located rearwardly of the rock shaft 20a. Pivotally suspended from the rear of the extension 191 is a rocker 16a connected by a pin 192 with the upper end of the lever 190 and with a yoke 193 which has a centrally apertured head 194 projecting into the extension 191 (see also FIG. 3). Threaded into the head is a control plunger 195 that extends forwardly through the end wall of a cup member 196 and terminates in a rigid collar 197 slidable axially within the cup. The cup, in turn, is slidable axially in a bore 198 formed in a transverse web of the housing 101.

A heavy coil spring 200 encircles the plunger 195 and bears at one end against the end wall of the cup 196 and at the other end against either a stop sleeve 201 threaded into the rear of the extension 191 or the end face of the head 194. The arrangement is such that under tension loads applied to the top link 14a, the spring 200 is compressed between the cup 196 and the stop 201. Under tension load the cup may be drawn rearwardly in the bore 198. When the tension load is relaxed, the spring 200 expands until the cup seats against a closure plate 202 closing the inner end of the bore 198. When compression is applied to the top link, the head 194 forces the spring 200 away from the sleeve 201 and the plunger advances, moving the collar 197 forwardly in the cup 196. The control spring 200 is thus compressed when either a tension or compression load is imposed in the top link 14a.

The reciprocating motions of the control plunger 195 are transmitted to the control system through a pushrod 203 having one end projecting through an aperture in the closure plate 202 for engagement by the collar 197. The end of the rod also extends through, and is guided in, an aperture in the web of the housing 101 adjacent the end of a cup receiving bore 198.

At its inner end, the pushrod 203 is connected by a pivot pin 204 to a pair of rocker plates 205 that are spaced laterally adjacent the end of the rod 203 and suspended on a pivot pin 206 mounted in the housing 101. The rocker plates 205 are yieldably urged in a direction to hold the pushrod 203 in engagement with the collar 197 by a coiled compression spring 207 encircling a guide rod 208. One end of the rod 208 is pivotally connected by a pin 209 to the projecting lower ends of the rocker plates 205 and the other end is received in and guided by an aperture in an angularly disposed bracket 210 carried on a transverse flange extending along the rear edge of the support plate 152. The spring 207 thus acts between the stationary bracket 210 and the rear end portion of the rod 208 to urge the rod rearwardly, and thus the spring supplies the desired bias to the rocker plates 205 and the pushrod 203.

For operating the valve 30a, the rocker plates 205 carry between them a follower roller 211 which, in the illustrated construction, is rotatably supported on the pin 204. The follower roller cooperates with a cam element 215 which is formed with a slot 216 at its forward end that embraces a sleeve 217 rotatably anchored to the upper end of the lever 146 (see also FIGS. 11 and 13). At its opposite end, the cam element 215 is formed with a substantially flat, downwardly depending cam surface 218 (see FIG. 6) adapted to ride on the roller 211 and disposed at an angle to the path described by the roller as the rocker plates 205 are swung on their pivot pin 206 in response to the urging of the draft responsive mechanism.

If not restricted, the cam element 215 simply swings freely on its pivot sleeve 217 and no movement is imparted to the valve lever 146 as the follower roller 211 moves back and forth. Selective restriction of such free pivotal movement of the cam element, and the conditioning of that element for imparting valve actuating movement to the valve lever, is a function of a draft control quadrant lever 220. The draft control lever 220 is fixed to the outer end of a shaft 221 journalled on and extending into the interior of the housing 101. The inner end of the shaft 221 extends through the rocker plates 205 and overlies the cam element 215. The inner portions of the rocker plates are cut away to accommodate the shaft.

A support collar 222 fixed to the shaft 221 carries a cam engaging element in the form of a roller 223 in eccentric relation to the axis of the shaft and in position to engage the upper edge of the cam element 215. The angular disposition of the roller 223 with respect to the shaft 221 is such that with the draft control lever 220 in its upper or "raise" position, the cam element 215 is left free for pivotal movement by the follower 211 through the entire range of movement of that roller by the draft responsive means. However, as the draft control lever 220 is swung forwardly, clockwise toward the position shown in dashed lines in FIG. 6, the cam element 215 is pushed down progressively against the cam follower roller 211. Due to the inclination of the cam surface 218, the cam element 215 is thus shifted bodily rearwardly swinging the valve lever 146 counterclockwise with the result that the main valve plunger 115 is moved to the left in FIG. 7 and toward the exhaust or drop position. This results in a lowering of the hitch linkage until the valve plunger is restored to its neutral position by appropriate movement of the cam follower roller 211 under the urging of the draft responsive plunger 195 and the follower rod 203. In effect, the movement of the draft control lever 220 forwardly from its uppermost position conditions the draft control linkage 40a for transmitting movement from the draft responsive mechanism to the control valve 30a. Furthermore, it adjusts the effective length of this linkage in accordance with the extent of the displacement of the lever 220 from its neutral position.

When the draft control lever 220 is swung back into its transport or upper position, the main valve plunger 115 is shifted back to its raise or intake position by the biasing spring 125, resulting in lifting of the hitch and the attached implement to its uppermost or transport position.

*Position control*

Figures 5, 6:
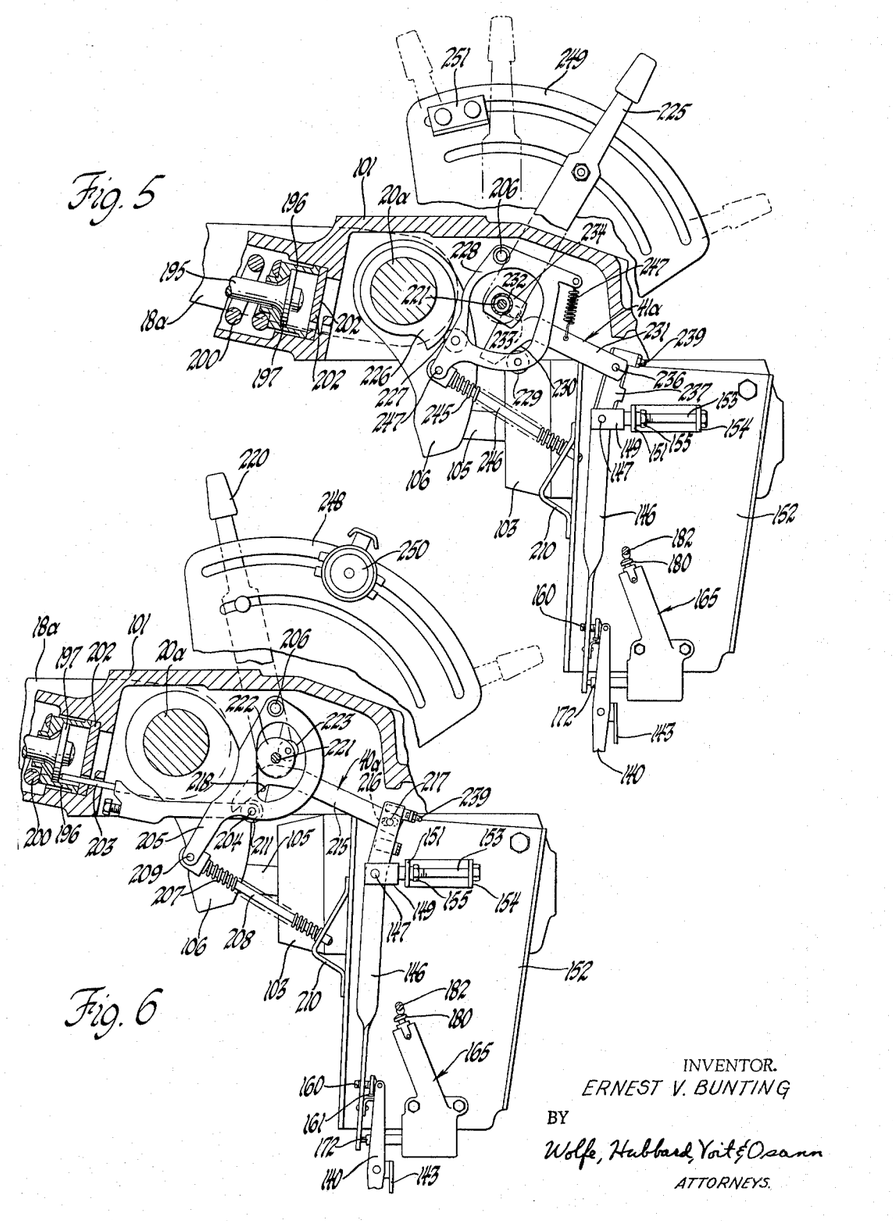
FIGS. 5 and 6 are fragmentary sections corresponding to and showing portions of, the structure otherwise illustrated in FIG. 4.

The position control linkage 41a affects shifting of the main valve plunger 115 under the joint control of a position control lever 225 and a cam 226 mounted on and rotatable with the rock shaft 20a (see FIGS. 3 and 5). The cam 226 coacts with a follower roller 227 carried by a pair of rocker plates 228 pivotally suspended from the pin 206 alongside of the rocker plates 205. The rocker plates 228 also carry a follower roller 229 cooperating with a cam surface 230 formed on the underside of a cam element 231 that is operatively associated with the valve lever 146. The cam surface 230 is positioned to ride on the follower roller 229 and is disposed at an angle to the path defined by the roller as the rocker plates 228 swing on their pivot in response to movements of the cam 226. The central portions of the rocker plates 228 are, of course, cut away to accommodate the shaft 221.

The position control lever 225 is secured to a sleeve 232 journalled on the shaft 221 and also extending from a position outside of the housing 101 to a point within the housing adjacent the rocker plates 228. A cam engaging roller 233 is mounted on a support plate 234 eccentrically of the sleeve 232 so as to coact with a cam surface formed on the upper edge of the cam element 231 adjacent its rear end. The roller 233 is angularly positioned on the sleeve 232 so that swinging the position control lever 225 clockwise as seen in FIG. 5 causes the roller 233 to engage the cam element 231 and urge it downwardly whereupon the interengagement of the cam surface 230 with the follower roller 229 pulls the cam element 231 rearwardly of the tractor.

The cam 231 is pivoted on a shaft 236 secured to an arm 237 that is pivoted freely on the sleeve 147 that rotatably supports the lever 146 (see also FIGS. 10–13). The arm 237 swings adjacent the upper end of the lever 146 and is formed with fingers 238 that embrace the forward edge of the lever 146. Preferably, the upper one of the fingers 238 threadably supports a set screw 239 that provides a settable abutment between the arm 237 and the lever 146. A lock nut 240 is adapted to hold the set screw 239 in adjusted position. Rearward movement of the cam element 231 thus swings the arm 237 counterclockwise until the screw 239 abuts the upper edge of the lever 146, whereupon the lever 146 is rotated incident to further rearward movement of the cam element 231. The slot 216 in the draft cam element 215 constitutes a lost motion connection between the draft cam element and the lever 146 permitting movement of the latter lever under the influence of the position cam element 231 without affecting the draft cam element 215. Conversely, the independent pivoting of the arm 237 allows the draft cam element 215 to swing the lever 146 away from the abutment set screw 239 without interfering with the position of the position cam element 231.

In short, both the draft cam element 215 and the position cam element 231, and of course their associated linkages 40a and 41a, have independent one-way connections with the valve control lever 146.

It can now be seen that the downward swinging and rearward movement of the cam element 231 resulting from rotating the transport lever 225 clockwise is effective to swing the arm 237 counterclockwise so as to pull the lever 146 in that same direction and thus shift the main valve plunger 115 toward the left and its exhaust position. This results in lowering of the hitch linkage as previously explained.

As the hitch linkage descends, the cam 226 swings the roller 227 and the rocker plates 228 forwardly, allowing the cam element 231 to return to its neutral position and the valve plunger 115 to be pulled by its control spring 125 back to its neutral or fluid blocking position. The elements of the position control linkage 41a are proportioned and positioned so that the main valve plunger 115 is brought into neutral position as the hitch linkage attains a position corresponding to that to which the control lever 225 has been swung. It will be evident that the lever 225, in effect, varies the effective length of the motion transmitting linkage between the position cam 226 and the valve plunger of the main valve so as to determine the position to which the hitch linkage must be moved to return the main valve to neutral position.

The cooperating cam surfaces and followers in the linkage 41a are yieldably held in engagement by springs including a coiled compression spring 245 that encircles a rod 246 pivotally connected by a pin 247 to the lower ends of the rocker plates 228 and slidably received in an aperture formed in the bracket 210. The spring 245 thus urges the roller 227 against the face of the cam 226. A second spring 247 is tensioned between the cam element 231 and the upper portion of the rocker plates 228 so as to hold the cam element in yieldable engagement with the cam follower roller 233 on the position lever sleeve 232.

Preferably, the control levers 220 and 225 swing adjacent respective quadrant plates 248 and 249, the levers being between the plates 248, 249 as shown in FIG. 4. A positionable stop 250 is mounted in an arcuate groove in the plate 248 so as to provide a convenient position indicating adjunct for the operator in setting the draft control lever 220. A positionable stop 251 is mounted in a corresponding slot formed in the quadrant plate 249 so as to readily establish the upright or transport position of the position control lever 225.

The control lever 225 can be moved farther to the rear around stop 251 to act through eccentric 234, roller 233, cam 231, lever 146, and lever 140 to positively and gradually move the control valve 30a to intake position. The position control follow up will not be effective at this time since the movement of cam 226 is limited by the crank arm 106 engaging a fixed stop, as shown in FIG. 1, when the links are in transport position. Thus the position control lever can be used to control an auxiliary cylinder through valve 32 of FIG. 1. Normally the shut off valve 31 would then be closed to prevent oil from escaping from the lift cylinder 21.

*Summary*

It can now be readily seen that the embodiment shown in FIGS. 3 et seq. performs and possesses the advantages of the control system 25 previously discussed. Furthermore, those skilled in the art will appreciate that the control system embodiment illustrated in FIGS. 3 et seq. is particularly well suited for commercial manufacture in that its parts are simply and economically formed and well suited for convenient initial assembly and adjustment. The system is mechanically straightforward and reliable.

The embodiments of the invention in which an exclusive property or privilege is claimed are defined as follows:

1. In a tractor having a hydraulic actuator for raising and lowering an implement hitch linkage trailingly pivoted at its rear end, valve means including a movable member operative in one position to initiate delivery of pressure fluid to the actuator to raise the hitch linkage and in another position to initiate exhaust of fluid from the actuator to lower the hitch linkage, said member being operative in an intermediate position to block delivery of fluid to or exhaust of fluid from the actuator, spring means urging said movable valve member toward said one position, control means including a member movable in response to changes in a first hitch linkage condition, other control means including a member movable in response to changes in a second hitch linkage condition, operating linkages connecting said movable members with said movable valve member, said linkages including one-way connections operative to render the linkages effective to transmit positive movements to said valve means only toward said other position, and adjusting means in each linkage operable manually and separately to vary the effective length of the respective linkages so as to permit selective variation of the conditions affecting the hitch linkage.

2. In a tractor having a hydraulic actuator for raising and lowering an implement hitch linkage trailingly pivoted at its rear end, valve means including a movable member operative in one position to initiate delivery of pressure fluid to the actuator to raise the hitch linkage and in another position to initiate exhaust of fluid from the actuator to lower the hitch linkage, said member being operative in an intermediate position to block delivery of fluid to or exhaust of fluid from the actuator, spring means urging said movable valve member toward said one position, control means including a member movable in response to changes in the draft load on the hitch linkage, other control means including a member movable in response to changes in the position of the hitch linkage, operating linkages connecting said control members with said movable valve member, said linkages including one-way connections operative to render the linkages effective to transmit positive movements to said valve means only toward said other position, and adjusting means in each linkage operable manually to vary the effective length of the respective linkages.

3. In a tractor having a hydraulic actuator for raising and lowering an implement hitch linkage trailingly pivoted at its rear end, valve means including a movable member operative in one position to initiate delivery of pressure fluid to the actuator to raise the hitch linkage and in another position to initiate exhaustion of fluid from the actuator to lower the hitch linkage, said member being operative in an intermediate position to block delivery of fluid to or exhaust of fluid from the actuator, spring means urging said movable valve member toward said one position, control means including a member movable in response to changes in the draft load on the hitch linkage, other control means including a member movable in response to changes in the position of the hitch linkage, operating linkages connecting said control means with said movable valve member including one-way connections operative to impart positive movement to the valve member only toward said other position, means for restricting the rate of movement of said valve member toward said other position, and a yieldable member in each linkage operative to temporarily change the effective length of the linkage when the associated control member is moved at a rate greater than the rate at which said valve member is permitted to move.

4. In a control system for a tractor having a vertically swingable implement hitch linkage and hydraulically operated actuator means for raising and lowering the hitch linkage, valve means having a shiftable member for controlling the delivery of pressure fluid to and exhaust of fluid from said actuator means, a pair of manually operable levers pivotally mounted on the tractor to swing between raising and lowering positions, a linkage system connecting each lever for selectively positioning said valve member, one linkage system including an element variably positioned in accordance with the draft load imposed on the hitch linkage, the other linkage system including an element shiftable in accordance with the position of the hitch linkage, said linkage systems being connected with said valve member so that either of said levers is operative through its linkage system when swung toward the lowering position to shift the valve member in a direction to cause said actuator means to lower the hitch linkage while the other lever remains in the raising position.

5. In a control system for a tractor having a vertically swingable implement hitch linkage and hydraulic actuator means for raising and lowering the hitch linkage, said actuator means including a ram, a valve having a shiftable member controlling the flow of pressure fluid to and exhaust of fluid from said ram, draft responsive means including an element movable in response to changes in the draft load imposed on the hitch linkage, a first motion transmitting linkage operatively connected with said element including a member shiftable by a first hand lever to adjust the effective length of said first motion transmitting linkages, position responsive mechanism including an element movable in unison with the hitch linkage, a second motion transmitting linkage connected with said last mentioned element including a member shiftable by a second hand lever to adjust the effective length of said second motion transmitting linkage, and means including an actuating lever providing a one-way connection between each linkage and said shiftable valve member enabling either of said hand levers to impart positive movement to said valve member in a hitch linkage lowering direction while the other hand lever remains in a hitch linkage raising position.

References Cited by the Examiner

UNITED STATES PATENTS

| | | | |
|---|---|---|---|
| 2,714,346 | 8/1955 | Valin | 172—9 X |
| 2,721,508 | 10/1955 | Edman | 172—9 |
| 2,946,113 | 12/1960 | Presnell | 172—9 |
| 2,996,124 | 8/1961 | Bunting | 172—9 |
| 2,996,125 | 8/1961 | Bunting | 172—9 |
| 3,002,571 | 10/1961 | Kersey et al. | 172—9 |
| 3,014,536 | 12/1961 | Marindin et al. | 172—9 |
| 3,080,003 | 5/1963 | Denker | 172—9 |
| 3,083,777 | 4/1963 | Maughan | 172—9 |

FOREIGN PATENTS

| | | |
|---|---|---|
| 1,210,941 | 10/1959 | France. |
| 871,053 | 6/1961 | Great Britain. |

ABRAHAM G. STONE, *Primary Examiner.*

F. B. HENRY, R. L. HOLLISTER, *Assistant Examiners.*